Patented Oct. 3, 1922.

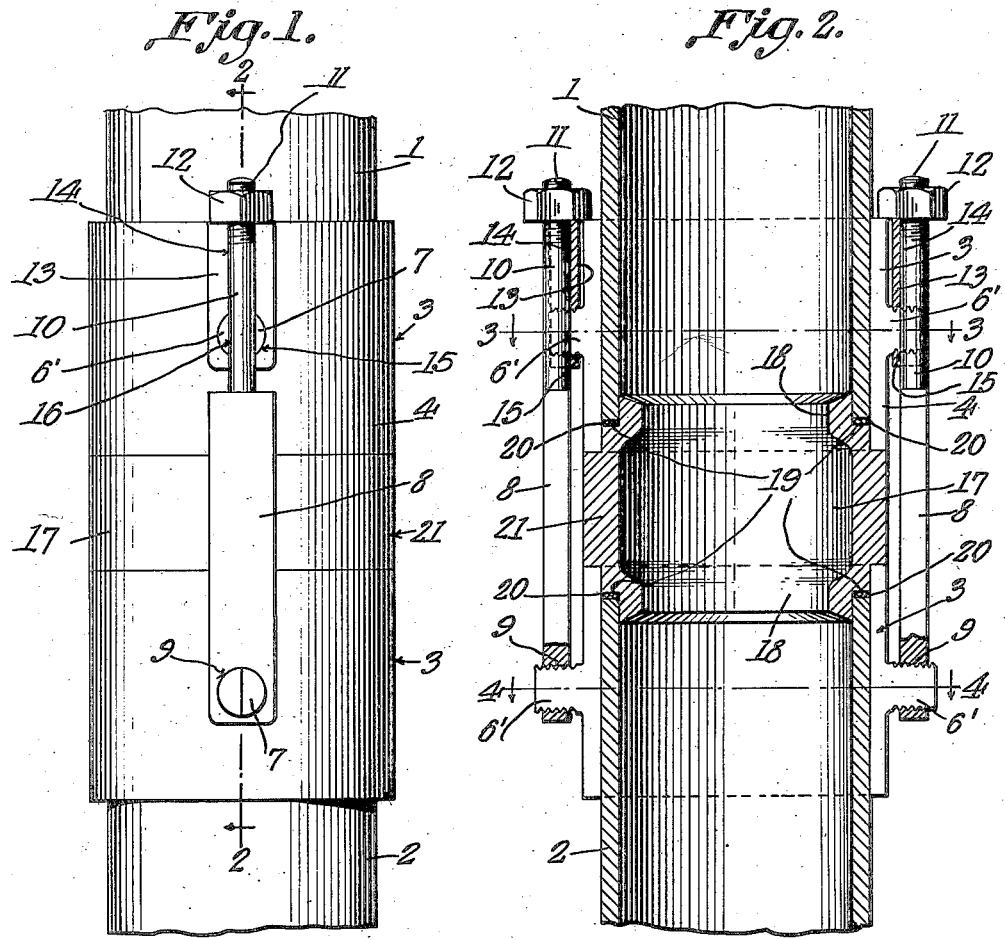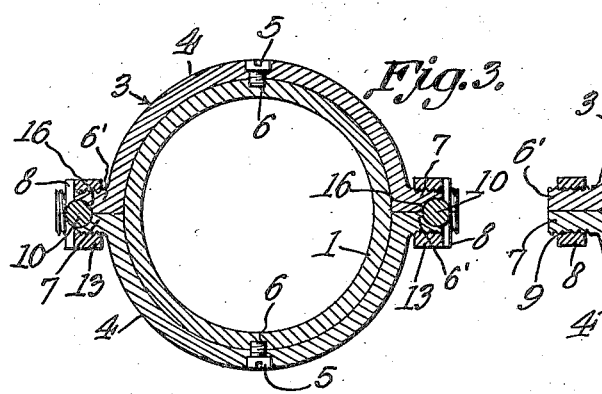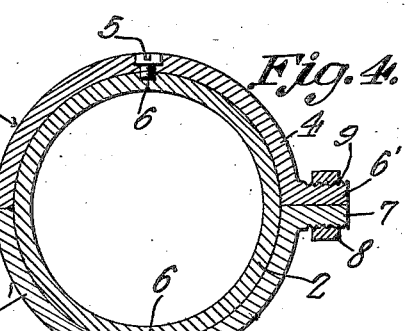

1,430,969

UNITED STATES PATENT OFFICE.

JAMES FILLIS, OF BROOKLYN, NEW YORK.

PIPE COUPLING.

Application filed July 14, 1921. Serial No. 484,736.

*To all whom it may concern:*

Be it known that I, JAMES FILLIS, a subject of the King of Greece, residing at Brooklyn, in the county of Kings and State of New York, have invented certain new and useful Improvements in Pipe Couplings, of which the following is a specification.

My invention relates to pipe couplings.

An important object of the invention is to provide a pipe coupling which may be employed for connecting the ends of pipes or the like, without having such ends screw-threaded, and which may be quickly and easily actuated for disconnecting the pipes, when it is desired to clean them.

A further object of the invention is to provide a pipe coupling of the above mentioned character, which is strong, durable, and not liable to derangements.

Other objects and advantages of the invention will be apparent during the course of the following description.

In the accompanying drawings forming a part of this specification, and in which like numerals are employed to designate like parts throughout the same—

Fig. 1 is a side elevation of a pipe coupling embodying my invention,

Fig. 2 is a longitudinal section taken on line 2—2 of Fig. 1, parts in elevation, Fig. 3 is a horizontal section taken on line 3—3 of Fig. 2, Fig. 4 is a similar view taken on line 4—4 of Fig. 2, and, Fig. 5 is a perspective view of one of the sockets included in the device.

In the drawings, wherein for the purpose of illustration is shown a preferred embodiment of my invention, the numerals 1 and 2 designate pipes which are to be connected.

The numeral 3 designates pipe receiving sleeves, of suitable diameter, to fit snugly over the ends of the pipes 1 and 2. Each sleeve 3 is preferably made in two separable semi-circular parts or sections 4. These sections carry machine screws 5, adapted to engage within screw-threaded openings or recesses 6, formed in the pipes. Instead of employing screws, I may employ lugs or projections, integral with the sleeve sections 4.

The sleeve sections 4 are provided at diametrically opposite points with semi-cylindrical extension or trunnion sections 6, which when assembled form cylindrical trunnions 7. These trunnions 7 are externally screw-threaded, as shown.

The numeral 8 designates strap-arms, preferably two in number, corresponding to the trunnions 7. At their lower ends, these strap-arms have screw-threaded openings 9, to engage upon the trunnions 7 of the lower sleeve 3. At their forward or upper ends, the strap-arms 8 are provided with reduced cylindrical extensions 10, screw-threaded at 11, for receiving nuts 12, as shown. The numeral 13 designates socket arms, provided with longitudinal grooves 14, and having screw-threaded openings 15 at their lower ends, as more clearly shown in Fig. 5. The groove 13 extends through both ends of the socket arm 13 and also through the screw-threaded opening 15, as shown. The reduced extensions 10 are adapted to lie within the grooves 14, and also within grooves 16, formed in the upper trunnions 7, as shown. The nuts 12 engage the upper ends of the socket arms 13.

The sleeves 3 extend toward each other beyond the ends of the pipes 1 and 2. The numeral 17 designates a coupling-sleeve, having reduced ends 18, entering the ends of the pipes 1 and 2, and shoulders 19, arranged in end to end relation to these pipes with packing 20 between the same. The coupling sleeve 17 has an annular flange 21, fitting between the sleeves 3, and preferably flush therewith.

In the use of the pipe coupling, with the sleeves 3 applied to the pipes 1 and 2, as shown in the drawings, when it is desired to disconnect the pipes, the nuts 12 are first removed from the reduced extensions 14. The screws 5 are now screwed out of the openings or recesses 6. The upper coupling 3 may now be shifted longitudinally upon the pipe away from the coupling sleeve 15. The sleeve 3 may now be bodily removed from the pipe 1 by unscrewing the socket arms 23 from the trunnions 7, whereby the sections 4 thereof are readily separable. The strap-arms 8 may now be rotated and unscrewed from the trunnions 7 of the lower sleeve 3, whereby the sections 4 of this lower sleeve may be readily separated. The ends of the pipes 1 and 2 may now be removed apart and the sleeve coupling 17 removed. The reverse of this operation occurs when assembling the several elements.

It is to be understood that the form of my invention, herewith shown and described, is to be taken as a preferred example of the same, and that various changes in the shape, size, and arrangement of parts may be resorted to without departing from the spirit of my invention or the scope of the subjoined claims.

Having thus described my invention, I claim:

1. In a pipe coupling, a two part sleeve to engage upon the end of the pipe or the like and provide with trunnion sections carried by said parts and adapted when assembled to form trunnions, said trunnions being screw-threaded, means to lock the sleeve on the pipe against longitudinal movement, a coupling sleeve extending into the end of the pipe carrying said sleeve and into the end of the pipe to be connected with the first named pipe, strap-arms having screw-threaded openings to receive the screw-threaded trunnions, and adjustable means connecting the strap-arms with the second named pipe.

2. In a pipe coupling, a two part sleeve to engage upon the end of a pipe or the like and provided with trunnion sections carried by said parts and adapted when assembled to form trunnions, said trunnions being screw-threaded, a co-acting pipe for connection with the first named pipe, strap-arms having screw-threaded openings to receive the screw-threaded trunnions, and adjustable means connecting the strap-arms and the co-acting pipe.

3. In a pipe coupling, a two part sleeve to engage upon the end of a pipe or the like and provided with trunnion sections carried by said parts and adapted when assembled to provide trunnions, said trunnions being screw-threaded, the parts of said sleeve carrying inwardly projecting extensions to engage in recesses in said pipe, strap-arms having screw-threaded openings to receive the trunnions, a second pipe for connection with the first named pipe, and adjustable means connecting the strap-arms and the second pipe.

4. In a pipe coupling, a two part sleeve for insertion upon the end of a pipe and provided with trunnion sections carried by said parts and adapted to be assembled to form trunnions, said trunnions being screw-threaded, socket arms having screw-threaded openings to receive the trunnions and provided with longitudinal grooves, inwardly projecting extensions carried by the parts of the sleeve and engaging within recesses formed in the pipe, strap-arms connected with a co-acting pipe to be connected with the first named pipe and having reduced extensions to enter said grooves in the socket arms, and nuts having screw threaded engagement with said reduced extensions.

5. In a pipe coupling, a two part sleeve for insertion upon the end of a pipe and provided with means to prevent the same from moving longitudinally upon the pipe, said sleeve projecting beyond the end of the pipe, said sleeve having trunnion sections formed upon the parts thereof and adapted to be assembled to form trunnions, said trunnions being screw-threaded, a co-acting two part sleeve arranged upon the end of a co-acting pipe and having means to prevent the same from moving longitudinally upon the pipe, the second named sleeve projecting beyond the end of said pipe, said sleeve having trunnion sections carried by the parts thereof and adapted to be assembled to form trunnions which are screw-threaded, strap-arms having screw-threaded openings to receive the first named trunnions, and provided with reduced screw-threaded extensions, socket arms having screw-threaded openings to receive the second named trunnions and provide with longitudinal grooves to receive the reduced extensions, nuts having screw-threaded engagement with said reduced extensions and engaging the socket arms, and a coupling sleeve having reduced ends to enter the ends of said pipes and an annular flange to fit between said sleeves.

6. In a pipe coupling, a two part sleeve, said parts having screw threaded trunnion sections co-acting to form screw threaded trunnions, elements having screw threaded openings to receive the trunnions, and means separate from the trunnions to clamp the sleeve to a pipe.

7. In a pipe coupling, a two part sleeve arranged upon one pipe section, said parts having screw threaded trunnion sections co-acting to form screw threaded trunnions, elements having screw threaded openings to receive the trunnions and extending longitudinally of the pipe sections, and means to attach said elements to the other pipe section.

In testimony whereof I affix my signature.

JAMES FILLIS.